G. EIRICH.
CHASING MILL WORKING IN LOOPED PATHS.
APPLICATION FILED DEC. 20, 1907.

931,585.  Patented Aug. 17, 1909.

Witnesses:
W. Bäuerle
R. Bußalb

Inventor:
Gustav Eirich

UNITED STATES PATENT OFFICE.

GUSTAV EIRICH, OF HARDHEIM, GERMANY.

CHASING-MILL WORKING IN LOOPED PATHS.

No. 931,585.    Specification of Letters Patent.    Patented Aug. 17, 1909.

Application filed December 20, 1907. Serial No. 407,436.

*To all whom it may concern:*

Be it known that I, GUSTAV EIRICH, manufacturer, a subject of the Grand Duke of Baden, and residing at Hardheim, in the Grand Duchy of Baden, German Empire, have invented a Chasing-Mill Working in Looped Paths, of which the following is a specification.

In the edge-mill-like mixing- and kneading-machines known up to now the rolls and the blades move generally in circles or concentric lines the center of which is formed by the vertical main-shaft of the machine. The portion of the upper surface of the mixing table touched by a roller or by a blade represents practically a ring, and the material acted upon in the machine is moved by the blades alternately from the inner side of the ring to the outer side and reversely, and while being thus moved the material is acted upon also by the rollers of the machine. Although the angular speed of the inner blades and of the outer blades is the same, still, with respect to the length of way traversed, the outer blades move quicker than the inner ones, and the material is thus acted upon by all these blades not so uniformly as must be desired with respect to obtaining a homogeneous product. Furthermore, as the material to be acted upon must often times be moistened, there arise in many cases balls as well as lumps or clods which must be crumbled and crushed by the rollers. Where there, as in an ordinary edge-mill or edge-mill-like mixing- and kneading-machine, the tools move only in circles there these balls and lumps or clods are but partially and but imperfectly crumbled and crushed by the rollers, and therefore, much time and power is necessary to produce a homogeneous mass. Endeavors have been made to overcome the before mentioned drawbacks by causing the rollers and blades or other tools to not only move in true circles but to deviate laterally from the circular path so as to enlarge the annular portion of the upper surface of the table upon which the tools work. Still, it has not proved possible to entirely overcome the drawbacks in question by these means, but this is now attained by my new and improved machine in which the roller or rollers and the blade or blades are caused to move in looped paths as will be more clear from the detailed description following.

In order to make my invention more clear I refer to the accompanying drawing in which similar letters denote similar parts throughout the several views and in which—

Figure 1:
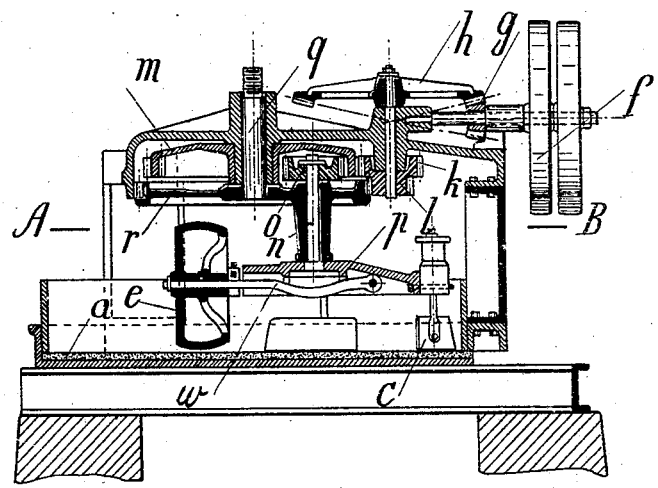
Figure 2:
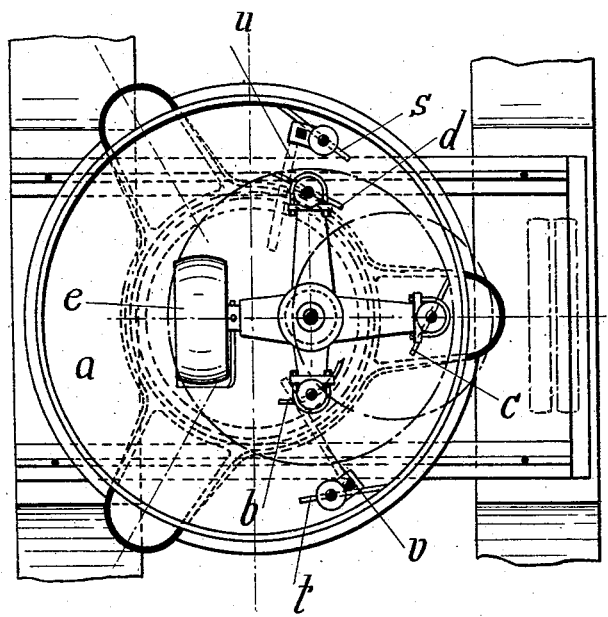

Figure 1 is a vertical section through one form of construction of a machine embodying my invention, and Fig. 2 is a horizontal section in line A—B.

There is, in the machine shown, one roller $e$ and three blades $b\ c\ d$ which are carried by the various arms of a star-like frame $p$ adapted to be rotated by and around a vertical shaft $n$. The roller $e$ is attached to a lever-like axle $w$ held by one of said arms and guided by the opposite arm in such a manner that the roller $e$ may freely move in a vertical direction while it is positively carried around in horizontal direction.

The upper portion of the frame of the machine supports another vertical shaft $i$ which has at its upper end a large bevel-wheel $h$ gearing with a small bevel-wheel $g$ which is connected by its shaft with a pulley $f$ by means of which the driving power is transmitted to the machine. To the lower end of the vertical shaft $i$ is keyed a double cog-wheel consisting of a larger cog-wheel $k$ and a smaller cog-wheel $l$. There is, further, in the upper portion of the machine a third vertical shaft $q$ having at its lower end a cog-wheel $r$ a portion of which forms a bearing for the vertical shaft $n$. The center portion or hub of the cog-wheel $r$ supports a hollow cog-wheel $m$ which is provided with teeth at its outer as well as its inner periphery. The teeth at the outer periphery are in gear with the cog-wheel $k$ and the teeth at the inner periphery are in gear with the cog-wheel $o$. Therefore, when the double cog-wheel $k\ l$ is rotated by the shaft $i$ the cog-wheel $r$ is rotated by the cog-wheel $l$ so that the shaft $n$ with the cog-wheel $o$ is carried around the shaft $q$. At the same time the hollow cog-wheel $m$ is rotated by the cog-wheel $k$ and owing to the angular speed of the cog-wheels $m$ and $r$ being different, the cog-wheel $o$ is rotated by the cog-wheel $m$ and thus the scraper supported by the star-like frame fixed to the shaft $n$ is rotated by and around this shaft while at the same time the whole is caused to revolve around the shaft $q$. It is, thus, obvious, that the roller $e$ as well as the blades $b\ c\ d$ are caused to move in looped paths so that every portion of the upper surface of the working table $e$ is touched by these scrapers or, in other words, so that each particle of the material present upon the table $a$ is acted upon by these blades or scrapers.

It is clear that there might be in the cog-wheel $r$ two or three vertical shafts $n$ with star-like frames with scrapers instead of only one, this being merely a question of dimensions, and it is further clear that the table $a$ need not be stationary, as in the form of construction shown, but may be rotary.

Having now described my invention what I desire to secure by Letters Patent of the United States is:

In a chasing mill, working in looped paths the combination of a frame carrying the blades or scrapers, a vertical shaft ($n$) holding said frame, a cog-wheel ($r$) holding said shaft, another shaft ($q$) holding said cog-wheel, a hollow cog-wheel ($m$) located above and concentric with said cog-wheel ($r$) and having teeth at its outer as well as at its inner periphery, a third cog-wheel located in the annular space of the said hollow cog-wheel and being secured to the upper end of the first mentioned shaft, a third vertical shaft ($i$) located outside of the cog-wheel ($r$), a double cog-wheel secured to the lower end of this shaft, said double cog-wheel consisting of an upper and larger portion gearing with the outer teeth of the said hollow cog-wheel, and of a smaller and lower portion gearing with the cog-wheel ($r$), and means for rotating the said third shaft, substantially and for the purpose as described.

In testimony whereof I have signed my name to this specification in the presence of two subscribing witnesses.

GUSTAV EIRICH.

Witnesses:
H. W. HARRIS,
JOS. H. LEUTE.